(12) United States Patent
Martinez Tarradell et al.

(10) Patent No.: US 9,564,958 B2
(45) Date of Patent: Feb. 7, 2017

(54) POWER SAVING MODE OPTIMIZATIONS AND RELATED PROCEDURES

(71) Applicant: Intel IP Corporation, Santa Clara, CA (US)

(72) Inventors: Marta Martinez Tarradell, Hillsboro, OR (US); Sangeetha L. Bangolae, Beaverton, OR (US); Puneet Jain, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/318,085

(22) Filed: Jun. 27, 2014

(65) Prior Publication Data

US 2015/0043403 A1 Feb. 12, 2015

Related U.S. Application Data

(60) Provisional application No. 61/863,902, filed on Aug. 8, 2013.

(51) Int. Cl.
*H04B 7/06* (2006.01)
*H04L 5/14* (2006.01)
(Continued)

(52) U.S. Cl.
CPC .......... *H04B 7/0626* (2013.01); *H04B 7/0617* (2013.01); *H04B 7/0639* (2013.01);
(Continued)

(58) Field of Classification Search
None
See application file for complete search history.

(56) References Cited

U.S. PATENT DOCUMENTS

| 7,932,597 B2 | 4/2011 | Terui et al. |
| 8,409,930 B2 | 4/2013 | Terui et al. |

(Continued)

FOREIGN PATENT DOCUMENTS

| CN | 104396313 A1 | 3/2015 |
| CN | 105359059 A | 2/2016 |

(Continued)

OTHER PUBLICATIONS

"U.S. Appl. No. 13/718,334, Non Final Office Action mailed Jul. 14, 2014", 16 pgs.

(Continued)

*Primary Examiner* — Kodzovi Acolatse
(74) *Attorney, Agent, or Firm* — Schwegman Lundberg & Woessner, P.A.

(57) ABSTRACT

Embodiments of an eNodeB and method for Machine Type Communication in a Wireless Network are generally described herein. In some embodiments, a method performed by circuitry of an evolved Node B (eNodeB) can include receiving, by the eNodeB, a notification that a User Equipment (UE) is configured to be used for Machine Type Communication (MTC). The method can include determining whether the UE is in a Radio Resource Control Connected (RRC_Connected) state and determining whether the UE can enter a power saving mode. The method can include configuring the UE to change to an RRC Deep Idle mode, in response to determining that the UE is in the RRC_Connected state and the UE can enter the power saving mode.

22 Claims, 6 Drawing Sheets

(51) Int. Cl.

| | | |
|---|---|---|
| *H04W 56/00* | (2009.01) | |
| *H04W 4/00* | (2009.01) | |
| *H04W 52/02* | (2009.01) | |
| *H04W 76/04* | (2009.01) | |
| *H04W 36/08* | (2009.01) | |
| *H04W 72/08* | (2009.01) | |
| *H04W 76/02* | (2009.01) | |
| *H04W 36/28* | (2009.01) | |
| *H04L 5/00* | (2006.01) | |
| *H04W 24/10* | (2009.01) | |
| *H04L 1/18* | (2006.01) | |
| *H04W 72/04* | (2009.01) | |
| *H04W 4/02* | (2009.01) | |
| *H04W 36/14* | (2009.01) | |
| *H04L 27/26* | (2006.01) | |
| *H04W 88/08* | (2009.01) | |

(52) U.S. Cl.
CPC .......... *H04L 1/1812* (2013.01); *H04L 5/0048* (2013.01); *H04L 5/0058* (2013.01); *H04L 5/14* (2013.01); *H04W 4/005* (2013.01); *H04W 24/10* (2013.01); *H04W 36/08* (2013.01); *H04W 36/28* (2013.01); *H04W 52/0206* (2013.01); *H04W 52/0209* (2013.01); *H04W 56/0005* (2013.01); *H04W 72/082* (2013.01); *H04W 76/02* (2013.01); *H04W 76/023* (2013.01); *H04W 76/046* (2013.01); *H04L 5/0053* (2013.01); *H04L 5/1469* (2013.01); *H04L 27/2602* (2013.01); *H04W 4/023* (2013.01); *H04W 36/14* (2013.01); *H04W 72/0406* (2013.01); *H04W 72/0446* (2013.01); *H04W 88/08* (2013.01); *Y02B 60/50* (2013.01)

(56) References Cited

U.S. PATENT DOCUMENTS

| | | | |
|---|---|---|---|
| 9,326,122 | B2 | 4/2016 | Xiong et al. |
| 9,407,391 | B2 | 8/2016 | Jain et al. |
| 9,499,995 | B2 | 11/2016 | Xiong et al. |
| 2006/0293061 | A1 | 12/2006 | Kobayashi et al. |
| 2007/0019578 | A1 | 1/2007 | Meiri |
| 2009/0122736 | A1 | 5/2009 | Damnjanovic et al. |
| 2009/0221284 | A1 | 9/2009 | Kim et al. |
| 2009/0327395 | A1 | 12/2009 | Park et al. |
| 2011/0080873 | A1 | 4/2011 | Zhang et al. |
| 2011/0199905 | A1 | 8/2011 | Pinheiro et al. |
| 2011/0274040 | A1 | 11/2011 | Pani et al. |
| 2011/0276816 | A1 | 11/2011 | Cooper et al. |
| 2011/0299485 | A1 | 12/2011 | Hannu et al. |
| 2012/0023355 | A1 | 1/2012 | Song et al. |
| 2012/0039321 | A1 | 2/2012 | Ghosh et al. |
| 2012/0069823 | A1 | 3/2012 | Low et al. |
| 2012/0087247 | A1 | 4/2012 | Min et al. |
| 2012/0106370 | A1 | 5/2012 | Radulescu et al. |
| 2012/0106456 | A1 | 5/2012 | Jin et al. |
| 2012/0113934 | A1 | 5/2012 | Ko et al. |
| 2012/0155351 | A1 | 6/2012 | Lee et al. |
| 2012/0163311 | A1 | 6/2012 | Park |
| 2012/0184306 | A1 | 7/2012 | Zou et al. |
| 2012/0207073 | A1 | 8/2012 | Kim et al. |
| 2012/0243431 | A1 | 9/2012 | Chen et al. |
| 2012/0249372 | A1 | 10/2012 | Jovicic et al. |
| 2012/0270584 | A1 | 10/2012 | Liang et al. |
| 2012/0275365 | A1 | 11/2012 | Anderson et al. |
| 2012/0275366 | A1* | 11/2012 | Anderson ......... H04W 52/0219 370/311 |
| 2012/0309419 | A1 | 12/2012 | Lee et al. |
| 2013/0017779 | A1 | 1/2013 | Song et al. |
| 2013/0028235 | A1* | 1/2013 | Barrett ................. H04W 60/04 370/331 |
| 2013/0044623 | A1 | 2/2013 | Speight et al. |
| 2013/0058306 | A1 | 3/2013 | Noh et al. |
| 2013/0077594 | A1* | 3/2013 | Park ................... H04W 72/042 370/329 |
| 2013/0080597 | A1 | 3/2013 | Liao |
| 2013/0170347 | A1 | 7/2013 | Zhang et al. |
| 2013/0194941 | A1 | 8/2013 | Lu et al. |
| 2013/0195026 | A1 | 8/2013 | Johnsson et al. |
| 2013/0223356 | A1 | 8/2013 | Khoshnevis et al. |
| 2013/0230035 | A1 | 9/2013 | Grandhi et al. |
| 2013/0260811 | A1 | 10/2013 | Rayavarapu |
| 2013/0288608 | A1 | 10/2013 | Fwu et al. |
| 2013/0294399 | A1 | 11/2013 | Lee |
| 2013/0301492 | A1 | 11/2013 | Ji et al. |
| 2013/0301499 | A1 | 11/2013 | Jain et al. |
| 2013/0310100 | A1 | 11/2013 | Lee et al. |
| 2013/0322276 | A1 | 12/2013 | Pelletier et al. |
| 2014/0003262 | A1 | 1/2014 | He et al. |
| 2014/0003348 | A1* | 1/2014 | Velev ................... H04W 60/06 370/328 |
| 2014/0010179 | A1 | 1/2014 | Lee |
| 2014/0016614 | A1 | 1/2014 | Velev et al. |
| 2014/0036876 | A1 | 2/2014 | Li et al. |
| 2014/0185529 | A1 | 7/2014 | Lim et al. |
| 2014/0213186 | A1 | 7/2014 | Gage et al. |
| 2014/0213259 | A1 | 7/2014 | Teyeb et al. |
| 2014/0241260 | A1 | 8/2014 | Schmidt et al. |
| 2014/0335867 | A1* | 11/2014 | Hsu ................... H04W 52/0225 455/437 |
| 2014/0370904 | A1 | 12/2014 | Smith et al. |
| 2015/0009883 | A1 | 1/2015 | Bai et al. |
| 2015/0016312 | A1 | 1/2015 | Li et al. |
| 2015/0043445 | A1 | 2/2015 | Xiong et al. |
| 2015/0043448 | A1 | 2/2015 | Chatterjee et al. |
| 2015/0043449 | A1 | 2/2015 | Bangolae et al. |
| 2015/0045016 | A1 | 2/2015 | Xiong et al. |
| 2015/0126196 | A1 | 5/2015 | Lu et al. |
| 2015/0163705 | A1 | 6/2015 | Lu et al. |
| 2015/0195831 | A1* | 7/2015 | Du ..................... H04W 74/004 370/329 |
| 2015/0257094 | A1* | 9/2015 | Wei ................... H04W 52/0212 370/311 |
| 2015/0334693 | A1 | 11/2015 | Lu et al. |
| 2016/0302251 | A1 | 10/2016 | Chatterjee et al. |
| 2016/0337835 | A1 | 11/2016 | Xiong et al. |

FOREIGN PATENT DOCUMENTS

| | | |
|---|---|---|
| CN | 105359476 A | 2/2016 |
| CN | 105359606 A | 2/2016 |
| CN | 105359615 A | 2/2016 |
| CN | 105379316 A | 3/2016 |
| CN | 106162533 A | 11/2016 |
| EP | 2509345 A1 | 10/2012 |
| JP | 2001308258 A | 11/2001 |
| JP | 2007053628 A | 3/2007 |
| JP | 2008244104 A | 10/2008 |
| JP | 2010519793 A | 6/2010 |
| JP | 2011039498 A | 2/2011 |
| JP | 2012010202 A | 1/2012 |
| JP | 2012178642 A | 9/2012 |
| JP | 2015515241 A | 5/2015 |
| JP | 2016527848 A | 9/2016 |
| KR | 1020090087098 A | 8/2009 |
| KR | 1020090106603 A | 10/2009 |
| KR | 1020110000479 A | 1/2011 |
| KR | 1020110068768 A | 6/2011 |
| KR | 1020110081100 A | 7/2011 |
| KR | 1020120039605 A | 4/2012 |
| KR | 1020130035964 A | 4/2012 |
| KR | 1020120137496 A | 12/2012 |
| KR | 1020130006673 A | 1/2013 |
| KR | 102016002118 A | 2/2016 |
| TW | 201521505 A | 6/2015 |
| WO | WO-2011083997 A2 | 7/2011 |
| WO | WO-2011099821 A2 | 8/2011 |
| WO | WO-2011100570 A1 | 8/2011 |
| WO | WO-2011112051 A2 | 9/2011 |
| WO | WO-2011119680 A2 | 9/2011 |

(56) References Cited

FOREIGN PATENT DOCUMENTS

| WO | WO-2012023280 A1 | 2/2012 |
|---|---|---|
| WO | WO-2012136311 A1 | 10/2012 |
| WO | WO-2012177002 A2 | 12/2012 |
| WO | WO-2013012759 A1 | 1/2013 |
| WO | WO-2013025057 A2 | 2/2013 |
| WO | WO-2013048193 A1 | 4/2013 |
| WO | WO-2013169789 A1 | 11/2013 |
| WO | WO-2015021267 A1 | 2/2015 |
| WO | WO-2015021276 A1 | 2/2015 |
| WO | WO-2015021284 A1 | 2/2015 |
| WO | WO-2015021315 A1 | 2/2015 |
| WO | WO-2015021317 A1 | 2/2015 |

OTHER PUBLICATIONS

"Evolved Universal Terrestrial Radio Access (E-UTRA) and Evolved Universal Terrestrial Radio Access Network (E-UTRAN)", 3GPP TS 36.300 v11.6.0 Technical Specification Group Radio Access Network. Release 11, (Jun. 2013), 209 pgs.

"Evolved Universal Terrestrial Radio Access (E-UTRA) and Evolved Universal Terrestrial Radio Access Network (E-UTRAN); Overall description; Stage 2", 3GPP TS 36.300 version 10.8.0 Release 10. ETSI TS 136 300. LTE., (Jul. 2012), 210 pgs.

"Evolved Universal Terrestrial Radio Access (E-UTRA); Physical Channels and Modulation", 3GPP TS 36.211 v11.0.0 Technical Specification Group Radio Access Network, Release 11, (Sep. 2012), 106 pgs.

"Evolved Universal Terrestrial Radio Access (E-UTRA); Physical layer procedures", 3GPP TS 36.213 v11.0.0 Technical Specification Group Radio Access Network, Release 11, (Sep. 2012), 143 pgs.

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.

"Evolved Universal Terrestrial Radio Access (E-UTRA); Radio Resource Control (RRC); Protocol specification", 3GPP TS 36.331 version 10.6.0 Release 10. ETSI TS 136 331. LTE, (Jul. 2012), 306 pgs.

"Evolved Universal Terrestrial Radio Access (E-UTRA); Requirements for support of radio resource management", 3GPP TS 36.133 version 10.7.0 Release 10. ETSI TS 136 133. LTE., (Jul. 2012), 661 pgs.

"Evolved Universal Terrestrial Radio Access (E-UTRA); User Equipment (UE) procedures in idle mode", 3GPP TS 36.304 version 10.6.0 Release 10. ETSI TS 136 304. LTE., (Jul. 2012), 35 pgs.

"Evolved Universal Terrestrial Radio Access (E-UTRA); User Equipment (UE) radio access capabilities", 3GPP TS 36.306 v11.3.0 Technical Specification Group Radio Access Network, Release 11, (Mar. 2013), 27 pgs.

"Evolved Universal Terrestrial Radio Access (E-UTRS) User Equipment (UE) procedures in idle mode", 3GPP TS 36.304 v11.4.0 Technical Specification Group Radio Access Network, Release 11, (Jun. 2013), 34 pgs.

"Evolved Universal Terrestrial Radio Access (E_UTRA); Multiplexing and channel coding", 3GPP TS 36.212 v11.0.0, Technical Specification Group Radio Access Network, Release 11, (Sep. 2012), 79 pgs.

"Evolved Universal Terrestrial Radio Access Network (E-UTRAN); S1 Application Protocol (S1AP)", 3GPP TS 36.413 v11.4.0 Technical Specification Group Radio Access Network, Release 11, (Jun. 2013), 274 pgs.

"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 291 pgs.

"International Application Serial No. PCT/US2013/039963, International Search Report mailed Jun. 12, 2013", 5 pgs.

"International Application Serial No. PCT/US2013/039963, Written Opinion mailed Jun. 12, 2013", 6 pgs.

"Long Term Evolution (LTE): A Technical Overview", Technical White Paper., (Jun. 19, 2007), 15 pgs.

"Long Term Evolution Protocol Overview", White Paper., [Online]. Retrieved from the Internet: <URL: http://www.freescale.com/files/wireless_comm/doc/white_paper/LTEPTCLOVWWP.pdf>, (Oct. 2008), 21 pgs.

"Machine-Type and other Mobil Data Applications Communications Enhancements", 3GPP TSG SA WG2 Meeting #92, TD S2-123002; 3GPP TR 23.887 v0.1.0, Release 12, (May 2012), 16 pgs.

"Machine-Type and other Mobile Data Applications Communications Enhancemetns", 3GPP TR 23.887 v1.1.0 Technical Specification Group Services and System Aspects (Release 12), (Sep. 2013), 153 pgs.

"Mobile radio interface Layer 3 specification; Core network protocols; Stage 3", 3GPP TS 24.008 V12.2.0. Technical Specification Group Core Network and Terminals. Release 12., (Jun. 2013), 682 pgs.

"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.

"Service requirements for Machine-Type Communications (MTC); Stage 1", 3GPP TS 22.368 version 10.5.0 Release 10. ETSI TS 122 368. Digital cellular telecommunications system (Phase 2+). Universal Mobile Telecommunications System (UMTS). LTE., (Jul. 2011), 18 pgs.

"Study on LTE Device to Device Proximity Services", 3GPP TSG Ran Meeting#58, RP-122009, Qualcomm Incorporated, [Online]. Retrieved from the Internet: <URL: http://www.3gpp.org/ftp/tsg_ran/TSG_RAN/TSGR_58/Docs/RP-122009.zip>, (2012), 6 pgs.

"Study on provision of low-Cost MTC UEs based on LTE", 3GPP TR 36.888 v2.1.1 Technical Specification Group Radio Access Network, Release 12, (Jun. 2013), 55 pgs.

"WirelessMoves: Thoughts on the evolution of wireless networks and mobile web 2.0", [Online]. Retrieved from the Internet: <URL: http://mobilesociety.typepad.com/mobile_life/2009/02/sae-review-part-2-mobility-and-connection-management.html>, (Feb. 4, 2009), 3 pgs.

Andreev, S., et al., "Efficient small data access for machine-type communications in LTE", 2013 IEEE International Conference on Communications (ICC), (2013), 3569-3574.

Cho, Bong Youl (Brian), "LTE RRC/RRM", TTA LTE/MIMO Standards/Technology Training. Nokia Siemens Networks., (May 2012), 30 pgs.

"U.S. Appl. No. 13/718,334, Advisory Action mailed Mar. 23, 2015", 3 pgs.

"U.S. Appl. No. 13/718,334, Examiner Interview Summary mailed Jan. 5, 2016", 3 pgs.

"U.S. Appl. No. 13/718,334, Final Office Action mailed Dec. 3, 2014", 16 pgs.

"U.S. Appl. No. 13/718,334, Non Final Office Action mailed Aug. 21, 2015", 18 pgs.

"U.S. Appl. No. 13/718,334, Notice of Allowance mailed Mar. 28, 2016", 12 pgs.

"U.S. Appl. No. 13/718,334, Response filed Jan. 21, 2016 to Non Final Office Action mailed Aug. 21, 2015", 19 pgs.

"U.S. Appl. No. 13/718,334, Response filed Mar. 3, 2015 to Final Office Action mailed Dec. 3, 2014", 18 pgs.

"U.S. Appl. No. 13/718,334, Response filed Oct. 10, 2014 to Non Final Office Action mailed Jul. 14, 2014", 22 pgs.

"U.S. Appl. No. 14/280,799, Non Final Office Action mailed Jul. 13, 2015", 34 pgs.

"U.S. Appl. No. 14/280,799, Notice of Allowance mailed Dec. 24, 2015", 8 pgs.

"U.S. Appl. No. 14/280,799, Response filed Aug. 27, 2015 to Non Final Office Action mailed Jul. 13, 2015", 11 pgs.

"U.S. Appl. No. 14/300,937, Final Office Action mailed Mar. 25, 2016", 11 pgs.

"U.S. Appl. No. 14/300,937, Non Final Office Action mailed Sep. 25, 2015", 12 pgs.

"U.S. Appl. No. 14/300,937, Response filed Dec. 22, 2015 to Non Final Office Action mailed Sep. 25, 2015", 13 pgs.

(56) References Cited

OTHER PUBLICATIONS

"U.S. Appl. No. 14/318,008, Non Final Office Action mailed Oct. 8, 2015", 16 pgs.
"U.S. Appl. No. 14/318,008, Response filed Feb. 8, 2016 to Non Final Office Action mailed Oct. 8, 2015", 13 pgs.
"Australian Application Serial No. 2013259726, First Examiner Report mailed Apr. 14, 2015", 4 pgs.
"Australian Application Serial No. 2013259726, Response filed Feb. 18, 2016 to First Examiner Report mailed Apr. 14, 2015", 9 pgs.
"Canadian Application Serial No. 2,871,087, Office Action mailed Feb. 24, 2016", 4 pgs.
"Discussion of D2D discovery methods", R1-132068, 3GPP TSG RAN WG1 Meeting #73, (May 2013), 1-5.
"Discussion on design options for D2D discovery", R1-131924, 3GPP TSG RAN WG1 Meeting #73, (May 2013), 1-6.
"European Application Serial No. 13786929.3, Extended European Search Report mailed Nov. 17, 2015", 12 pgs.
"International Application Serial No. PCT/US2013/039963, International Preliminary Report on Patentability mailed Nov. 20, 2014", 8 pgs.
"International Application Serial No. PCT/US2014/050128, International Preliminary Report on Patentability mailed Feb. 18, 2016", 9 pgs.
"International Application Serial No. PCT/US2014/050128, International Search Report mailed Nov. 13, 2014", 8 pgs.
"International Application Serial No. PCT/US2014/050128, Invitation to Correct Defects mailed Aug. 14, 2014", 4 pgs.
"International Application Serial No. PCT/US2014/050128, Written Opinion mailed Nov. 13, 2014", 7 pgs.
"International Application Serial No. PCT/US2014/050147, International Preliminary Report on Patentability mailed Feb. 18, 2016", 8 pgs.
"International Application Serial No. PCT/US2014/050147, International Search Report mailed Nov. 13, 2014", 3 pgs.
"International Application Serial No. PCT/US2014/050147, Written Opinion mailed Nov. 13, 2014", 6 pgs.
"International Application Serial No. PCT/US2014/050159, International Preliminary Report on Patentability mailed Feb. 18, 2016", 9 pgs.
"International Application Serial No. PCT/US2014/050159, International Search Report mailed Nov. 18, 2014", 3 pgs.
"International Application Serial No. PCT/US2014/050159, Written Opinion mailed Nov. 18, 2014", 7 pgs.
"International Application Serial No. PCT/US2014/050207, International Preliminary Report on Patentability mailed Feb. 18, 2016", 8 pgs.
"International Application Serial No. PCT/US2014/050207, International Search Report mailed Nov. 19, 2014", 3 pgs.
"International Application Serial No. PCT/US2014/050207, Written Opinion mailed Nov. 19, 2014", 6 pgs.
"International Application Serial No. PCT/US2014/050209, International Search Report mailed Nov. 27, 2014", 3 pgs.
"International Application Serial No. PCT/US2014/050209, Written Opinion mailed Nov. 27, 2014", 8 pgs.
"International Application Serial No. T/US2014/050209, International Preliminary Report on Patentability mailed Feb. 19, 2016", 10 pgs.
"Japanese Application Serial No. 2015-509219, Notice of Reasons for Rejection mailed Mar. 22, 2016", (English Translation), 3 pgs.
"Japanese Application Serial No. 2015-509219, Office Action mailed Sep. 15, 2015", W/ English Translation, 6 pgs.
"Japanese Application Serial No. 2015-509219, Response filed Dec. 15, 2015 to Office Action mailed Sep. 15, 2015", 18 pgs.
"Korean Application Serial No. 2014-7031575, Office Action mailed Aug. 17, 2015", W/ English Translation, 12 pgs.
"Korean Application Serial No. 2014-7031575, Reasons for Rejection mailed Feb. 22, 2016", (English Translation), 11 pgs.

"Korean Application Serial No. 2014-7031575, Response filed Oct. 19, 2015 to Office Action mailed Aug. 17, 2015", W/ English Claims, 36 pgs.
ProSe direct communication (D2D), R1-132174, 3GPP TSG-RAN WG1 Meeting #73, Renesas Mobile Europe Ltd, (May 2013), 1-4.
"Taiwanese Application Serial No. 103125302, Office Action mailed Sep. 23, 2015", W/ English Translation, 7 pgs.
"Taiwanese Application Serial No. 103125302, Response filed Dec. 17, 2015 to Office Action mailed Sep. 23, 2015", 'w/ English Claims, 20 pgs.
"Techniques for D2D Discovery", R1-132503, 3GPP TSG RAN WG1 Meeting #73, (May 2013), 1-7.
Alcatel-Lucent, et al,, "PRACH coverage extension for MTC devices", R1-130939, 3GPP TSG-RAN WG1 Meeting #72bis, Chicago, USA, [Online]. Retrieved from the Internet: <URL: http://www.3gpp.org/ftp/tsg_ran/wgl_r11/TSGRL_72b/Docs/>, (Apr. 15-19, 2013), 3 pgs.
Alcatel-Lucent, Shanghai Bell, et al., "Discussion on MTC Idle states", 3GPP TSG-WG #69-bis R2-102033, [Online]. Retrieved from the Internet: <http://www.3gpp.org/ftp/tsg_ran/WG2_RL2/TSGR2_69bis/Docs/R2-102033.zip>, (Apr. 1, 2010).
Ericsson, et al., "D2D for LTE Proximity Services: Overview", 3GPP TSG-RAN WG1 #73, R1-132028, (May 2013), 6 pgs.
Nokia, "DRXparameters in LTE", 3GPP Draft; R2-071285 DRXparameters in E-UTRAN, 3rd Generation Partnership Project (3GPP), Mobile Competence Centre 650, Route Des Lucioles ; F-06921 Sophia-Antipolis Cedex; France, vol. RAN WG2, no. St. Julian, (Mar. 2007).
Nokia, "Mobility Management in LTE_IDLE state", 3GPP Draft; S2-060688 Idle, 3rd Generation Partnership Protect (3GPP), Mobile Competence Centre ; 650, Route Des Lucioles ; F-06921 Sophia-Antpolis Cedex; France, vol. SA WG2, no, (Feb. 7, 2006).
Nokia Siemens Networks, et al., "UE power saving and fast dormancy in LTE network", 3GPP Draft; R2-104783 (Battery Saving), 3rd Generation Partnership Project (3GPP), Mobile Competence Centre ; 650, Route Des Lucioles ; F-06921 Sophia-Antipolis Cedex; France, vol. RAN WG2, no. Madrid, Spain, (Aug. 16, 2010).
"U.S. Appl. No. 15/096,504, Preliminary Amendment filed Aug. 5, 2016", 7 pgs.
"U.S. Appl. No. 13/718,334, Corrected Notice of Allowance mailed Apr. 8, 2016", 8 pgs.
"U.S. Appl. No. 14/314,957, Non Final Office Action mailed May 12, 2016", 32 pgs.
"U.S. Appl. No. 14/318,008, Final Office Action mailed Feb. 25, 2016", 16 pgs.
"Brazilian Application Serial No. 112014025345-5 Preliminary Amendment filed on Jan. 13, 2016", W/ English Claims, 17 pgs.
"Japanese Application Serial No. 2015-509219, Response filed Apr. 1, 2016 to Notice of Reasons for Rejection mailed Mar. 22, 2016", 7 pgs.
"Korean Application Serial No. 2014-7031575, Response filed Apr. 22, 2016 to Reasons for Rejection mailed Feb. 22, 2016", (English Translation of Claims), 29 pgs.
"Mexican Application Serial No. MX/a/2014/013757, Office Action mailed Apr. 29, 2016", W/ No Translation, 2 pgs.
"Chinese Application Serial No. 201480038461.6, Voluntary Amendment filed Jun. 17, 2016", w/ English Translation of Request form, 52 pgs.
"European Application Serial No. 13786929.3, Communication Pursuant to Article 94(3) EPC mailed Jul. 5, 2016", 4 pgs.
"Korean Application Serial No. 2014-7031575, Office Action mailed Jun. 9, 2016", W/ English Translation, 16 pgs.
"Mexican Application Serial No. MX/a/2014/013757, Response filed Jul. 11, 2016 to Office Action mailed Apr. 29, 2016", w/ English Machine Translation, 21 pgs.
"U.S. Appl. No. 13/718,334, Corrected Notice of Allowance mailed Jun. 14, 2016", 2 pgs.
"U.S. Appl. No. 14/300,937, Notice of Allowance mailed Jul. 15, 2016", 10 pgs.
"U.S. Appl. No. 14/314,957, Examiner Interview Summary mailed Jul. 19, 2016", 3 pgs.

(56) References Cited

OTHER PUBLICATIONS

"U.S. Appl. No. 14/314,957, Response filed Jul. 13, 2016 to Non Final Office Action mailed May 12, 2016", 18 pgs.
"Canadian Application Serial No. 2,871,087, Response filed Aug. 15, 2016 to Office Action mailed Feb. 24, 2016", 17 pgs.
"Korean Application Serial No. 10-2016-7000316, Office Action mailed Sep. 6, 2016", W/ English Translation, 9 pgs.
"Korean Application Serial No. 2014-7031575, Office Action mailed Sep. 27, 2016", w/ English Translation, 6 pgs.
"Korean Application Serial No. 2016-7000399, Office Action mailed Oct. 20, 2016", W/ English Translation, 9 pgs.
"U.S. Appl. No. 14/318,006, Response filed Aug. 25, 2016 to Final Office Action mailed Apr. 25, 2016", 12 pgs.
"U.S. Appl. No. 14/318,008, Notice of Allowance mailed Sep. 16, 2016", 13 pgs.
"U.S. Appl. No. 15/225,483, Preliminary Amendment filed Sep. 27, 2016", 5 pgs.
"European Application Serial No. 13786929.3, Response filed Nov. 15, 2016 to Extended European Search Report mailed Nov. 17, 2015", 34 pgs.
"Korean Application Serial No. 10-2016-7000316, Response filed Nov. 4, 2016 to Office Action mailed Sep. 6, 2016", W/ English Translation Of Claims, 27 pgs.
"Korean Application Serial No. 2014-7031575, Response filed Nov. 25, 2016 to Office Action mailed Sep. 27, 2016", 11 pgs.

\* cited by examiner

POWER SAVING MODE OPTIMIZATIONS AND RELATED PROCEDURES

CLAIM OF PRIORITY

This patent application claims the benefit of priority of U.S. Provisional Patent Application Ser. No. 61/863,902, entitled "Advanced Wireless Communication Systems and Techniques," filed on Aug. 8, 2013, which is hereby incorporated by reference herein in its entirety.

BACKGROUND

User Equipment (UE) that is used for Machine Type Communication (MTC) or MTC applications, such as a smart meter, have certain characteristics such as being nomadic, having low mobility, having low priority data transmissions, or sending small amounts of MO (Mobile Originated) or MT (Mobile Terminated) data very infrequently or according to a schedule. Given the wide array of possibilities of MTC applications and devices, it is expected that there will be trillions of Machine to Machine (M2M) communications. Accordingly, the various data generated by the M2M communications is intended to be transferred efficiently and use minimum power consumption from the UE in order to increase the life of the UE.

Figure 1:
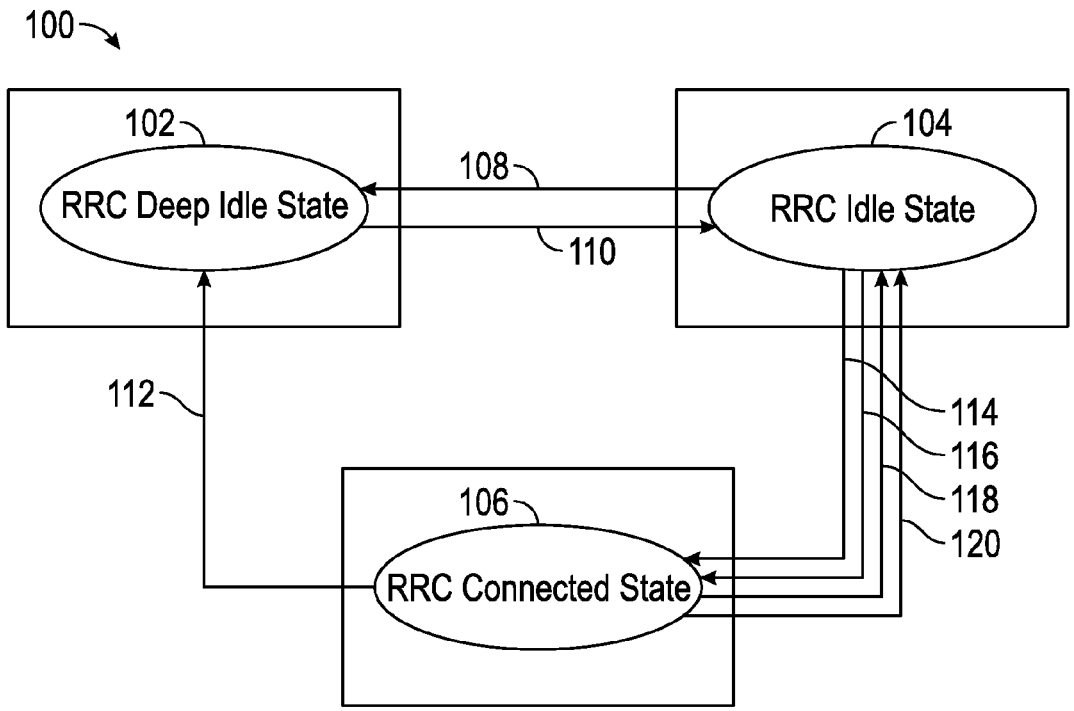
FIG. 1 illustrates generally an example of a diagram showing User Equipment (UE) states and transitions including an RRC Deep Idle state in accordance with some embodiments.

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Techniques to minimize power consumption in User Equipment (UE) used for Machine Type Communication (MTC) are desired. One technique to convey power saving related information can be through a Radio Resource Control (RRC) Connection Release or an equivalent message in RRC. The new RRC power saving mode is referred to herein as a Radio Resource Control Deep Idle (RRC Deep Idle) mode or an RRC Deep Idle state and can also be understood to be a sub-state within an RRC_Idle state or power saving mode that a UE could apply when in an RRC_Idle state. The power saving mode can support an efficient algorithm to transfer or check for data without incurring the signaling overhead and with maximum power saving by minimizing the UE connected time. The new power saving state, mode, or sub-state can include indicating when a UE is still registered to a network but can have Access Stratum (AS) turned OFF. The UE can include not having any pending idle mode related activities, such as checking for paging, taking measurements, or performing a cell reselection procedure. The new power saving sub-state within RRC Idle is referred to herein as an RRC Deep Idle mode or state.

In an example, the UE can transit between the RRC Deep Idle state and legacy states using an efficient technique that allows the UE to send, receive, or check for data reducing the time to minimize UE power consumption. The technique can also reduce the signaling overhead.

Another method can include an enhancement to the Core Network (CN) procedures, to prevent a download of the UE context to an evolved Node B (eNodeB) if no data activity is expected in uplink (UL) or downlink (DL). Stated another way, the technique can include downloading the UE context to an eNodeB only if data activity is expected in UL or DL. Before the UE moves to connected mode from the new power saving state, the eNodeB can request a Mobility Management Entity (MME) to transfer the UE context.

In an example, the transmission of UE context can be minimized if no data activity is expected for the UE. In an example, the UE can go back to the new RRC power saving mode if data activity is not expected in UL or DL. For example, the UE can indicate to the eNodeB that the UE is establishing a connection without a need to send any UL data or without UL data to send. The eNodeB can request the UE context from the MME if there is DL data waiting to be sent, or the eNodeB can skip requesting UE context from the MME if there is no DL data waiting to be sent. In the example where the eNodeB requests the UE context from the MME, the MME can send the UE context. In another case of the example above, the MME can enable a flag saying that the UE is reachable but that the UE context will not be conveyed to the eNodeB unless DL data is received. In an example, the MME can send some simple communication to the eNodeB or coordinate with the eNodeB to keep the MME and the eNodeB in sync about the current UE state. The MME can also reject a request from the eNodeB for the UE context, such as by indicating that no DL is waiting to be sent to the UE.

The MME can determine that the UE came from the new RRC power saving mode for a periodic TAU. The MME can also check if any MT (DL) data might be pending to be sent to the UE. For example, the technique for determining that the UE came from the new RRC power saving mode can use the current RRC-Establishment-Cause or NAS-PDU message or the technique can use a new IE (e.g. MT-check) to indicate that the UE came back to connected mode although no MO data activity is expected. In an example, S-GW or P-GW can be used to determine if there is DL data to be sent.

In an example, the techniques to improve power consumption in the UE can include conveying power saving related information through an RRC Connection Release message or an equivalent message. Another example can include additional details in relation to the new RRC power saving mode, such as in relation to transferring or checking for data without incurring the signaling overhead. The additional details can also include saving power by minimizing the UE connected time.

In an example, the RRC Connection Release message or another RRC message already existing or a new RRC message can trigger power saving techniques. The RRC Connection Release message or an equivalent message can also indicate or convey information to the UE to save extra power, such as extended Discontinuous Reception (DRX) Cycle value, support, activation or related parameters (e.g. other timers in relation to how often periodic TAU needs to be done based on an extended DRX Cycle). The RRC Connection Release message or an equivalent message can include releasing the Cause Indicator to have the UE transition to the new RRC power saving mode (e.g., RRC Deep Idle state or RRC Deep Idle mode sub-state within RRC Idle). Additionally, the RRC Connection Release message or an equivalent message can include timers related to the new RRC power saving mode.

In an example, a technique to identify support of the new RRC power saving mode can include determining whether the UE can support extreme delays, such as when a first packet is sent while the UE is in the new RRC power saving mode. In another example, identifying support of the new RRC power saving mode can include sending or receiving an indication that a UE supports the new functionality of the RRC power saving mode, which can include an indication from a UE, from an eNodeB, to a UE, to an eNodeB, or any combination of these indications.

UE radio capabilities can be used to indicate the support of the new RRC power saving mode in the UE, such as by using a new parameter. In an example, the new parameter can be expressed by a new field, such as 4.3.8.10 extreme-DelayTolerant, for example, as can be added to a technical specification similar to 3GPP Technical Specification 36.306 "Evolved Universal Terrestrial Radio Access (e-UTRA); User Equipment (UE) radio access capabilities", (e.g., release version 12.0.0 or later). The new parameter can include defining whether the device (such as a UE) can delay its data transmission or reception in order of the extended DRX cycle for all its applications, such as an extremeDelayTolerant, powerSavingSupport, deepIdleSupport, or unreachableSupport parameter where the value of 1 can indicate that the device tolerates long delays, (e.g., in order of the extended DRX cycle).

The new RRC power saving state can be a dynamic setting that can include being enabled or disabled depending on UE specific requirements. The dynamic setting can include an indication, such as through Non-Access Stratum (NAS) protocol data unit (PDU) or an RRC message. In an example, the indication can include a NAS PDU sent by the UE to the Mobility Management Entity (MME) having Power Saving Related information, such as Attach or Tracking Area Update (TAU) request. The MME can also convey the information to the eNodeB such as through the context transfer. In an example, the indication can include an RRC message sent by the UE including sending Power Saving related Information through the uplink RRC messages to the eNodeB, such as by RRC Connection reconfiguration complete or RRC Connection setup complete indications. The Power Saving related Information can include the deactivation or activation of the new RRC power saving mode through a new information element, such as a Boolean or enumerator indicator. The Power Saving related Information can also include new Timer values related to the new RRC power saving mode, such as a timer to indicate when the UE should enter into the new RRC power saving mode or a timer to indicate how long the UE should stay in the new RRC power saving state before coming back. In an example, the new Timer values can be included in an RRC message sent to the eNodeB or in the NAS PDU information sent to the MME by the UE through TAU or Attach.

In an example, a network can indicate its support or parameters associated with the new RRC power saving mode through broadcast or dedicated signaling, such as using a System Information Block (SIB) message, MacMainConfig IE, Other-Config IE, using existing RRC or NAS messages (e.g., RRC Connection Release) or using a new RRC or NAS message. The support or parameters associated with the new RRC power saving mode can include the deactivation or activation of the new RRC power saving mode through a new information element, such as a Boolean or enumerator indicator. The support or parameters associated with the new RRC power saving mode can also include new Timer values related to the new RRC power saving mode, such as a timer to indicate when the UE should enter into the new RRC power saving mode or a timer to indicate how long the UE should stay in the new RRC power saving mode before returning to the other state.

FIG. 1 illustrates generally an example of a diagram 100 showing UE states and transitions including an RRC Deep Idle state in accordance with some embodiments. In an example, a new RRC power saving state can include an RRC Deep Idle State 102 and the RRC Deep Idle State 102 can be called an RRC power saving state or a sub-state or mode of an RRC Idle state 104. The RRC Deep Idle state 102 can be reached after the UE stays in an RRC Idle state 104 for a certain time, such as until an active timer expires using Idle to Deep Idle transition 108. The UE can stay in the RRC Deep Idle state 102 until new Uplink (UL) data is pending, or until an internal timer expires, such as TAU or a timer to check whether there is Downlink (DL) data waiting to be sent to the UE. The UE can leave the RRC Deep Idle state 102 for the RRC Idle state 104, including by using Deep Idle to Idle transition 110.

In an example, the RRC Connected state 106 of the UE can be released and the UE can directly transfer to the RRC Deep Idle state 102 including by using Connected to Deep Idle transition 112. In another example, the UE RRC connection can be retained, such as for cases in which the UE comes out of a power saving state and there is no data activity waiting to be sent or no indication that any server or application has tried to reach the UE.

In an example, a UE can transition to a power saving state directly from a connected state, such as by using the Connected to Deep Idle transition 112 to go from RRC Connected state 106 to RRC Deep Idle state 102. The transition can include using the Connected to Deep Idle transition 112 when a network sends an indication, such as a new message (e.g., creating a new RRC Power Saving Release message) or a new Information Element (IE) in any of the existing messages (e.g., using RRC Release message with a new powerSavingIndication IE). In another example, the transition can include using the Connected to Deep Idle transition 112 after a certain time has elapsed, such as by expiration of a timer predefined by the network or the UE or negotiated or defined by the technical specification (e.g. a connected to power saving timer).

In an example, a UE can transition to the RRC Idle state 104 automatically from the RRC Connected state 106 using Connected to Idle transition using timer 120 after a certain time has elapsed, such as by expiration of a timer predefined by the network or the UE or negotiated or defined by the technical specification (e.g. a connected to idle timer or a connected timer). In this technique, using the RRC release message can be avoided.

The techniques described above can also be applied in cases that the UE sends or receives data.

In an example, the UE RRC Connection can be released so that the UE transitions from the RRC Connected state 106 to the RRC Idle state 104 by using Connected to Idle transition using indication 118, such as by a network indication through RRC Release Timer. The UE can transition from the RRC Idle state 104 to the RRC Connected state 106 by using Idle to Connected transition 116, including by establishing an RRC Connection, such as by a network indication through a page or a UE decision due to UL data or by the expiration of periodic timers (e.g., TAU periodic timer or T3412). The UE can transition from the RRC Idle state 104 to the RRC Deep Idle state 102 by using the Idle to Deep Idle transition 108, such as by a UE decision due to the expiration of a timer (e.g., an active timer or reachable timer or idle timer). The UE can transition from the RRC Deep Idle state 102 to the RRC Idle state 104 by using the Deep Idle to Idle transition 110, such as by a UE decision due to Mobile-Originated (MO) or DL data or the expiration of a timer (e.g., a TAU timer or unreachable timer or power saving timer). The UE can thus transition from the RRC Deep Idle state 102 to the RRC Connected state 106 via the RRC Idle state 104 by using Deep Idle to Idle transition 110 and Idle to Connected transition from Deep Idle 114, and the UE can establish an RRC Connection.

In an example, the RRC Connected state 106 can include the UE being reachable by the eNodeB. In an example, the RRC Idle state 104 can include the UE being reachable by the eNodeB. In an example, the RRC Deep Idle state 102 can include the UE being unreachable by the eNodeB. The RRC Deep Idle state 102 can include deactivating the AS.

Figure 2:
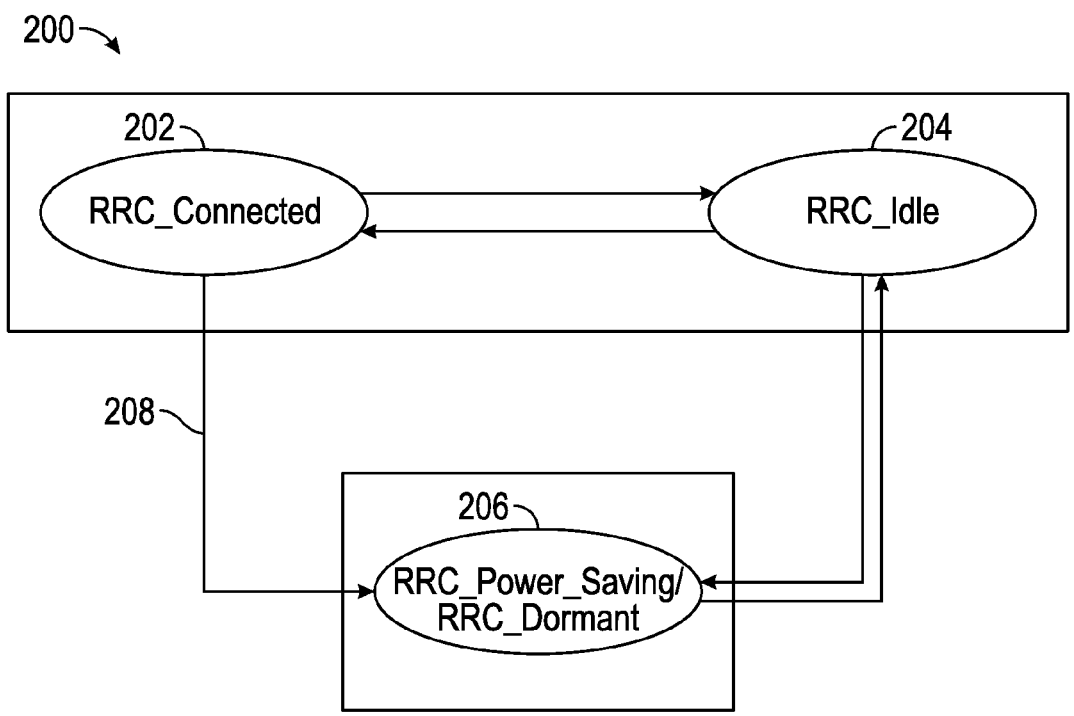
FIG. 2 illustrates generally an example of a diagram showing UE states and transitions including a power saving state in accordance with some embodiments.

FIG. 2 illustrates generally an example of a diagram 200 showing UE states and transitions including a power saving state in accordance with some embodiments. In an example, the new RRC power saving mode can include an RRC_Power_Saving or RRC_Dormant state 206. Transitions between the RRC_Connected state 202 and the RRC_Idle state 204 were previously discussed in relation to the RRC Connected state 106 and the RRC Idle state 104 of FIG. 1. Similarly, transitions between the RRC_Idle state 204 and the RRC_Power_Saving or RRC_Dormant state 206 were previously discussed in relation to the RRC Idle state 104 and the RRC Deep Idle state 102 of FIG. 1. The RRC_Power_Saving or RRC_Dormant state 206 can include a related Evolved Packet System (EPS) Mobility Management (EMM) state where the UE is unreachable, such as EMM-REGISTERED.DEEP-IDLE or EMM-REGISTERED.UN-REACHABLE or EMM-REGISTERED.POWER-SAVING or EMM-REGISTERED.DORMANT. For example, the RRC Connection Release to Power Saving transition 208 can include entering the UE unreachable EMM state, such as where the UE is registered, the AS activity is deactivated, and the device is considered unreachable.

Figure 3:
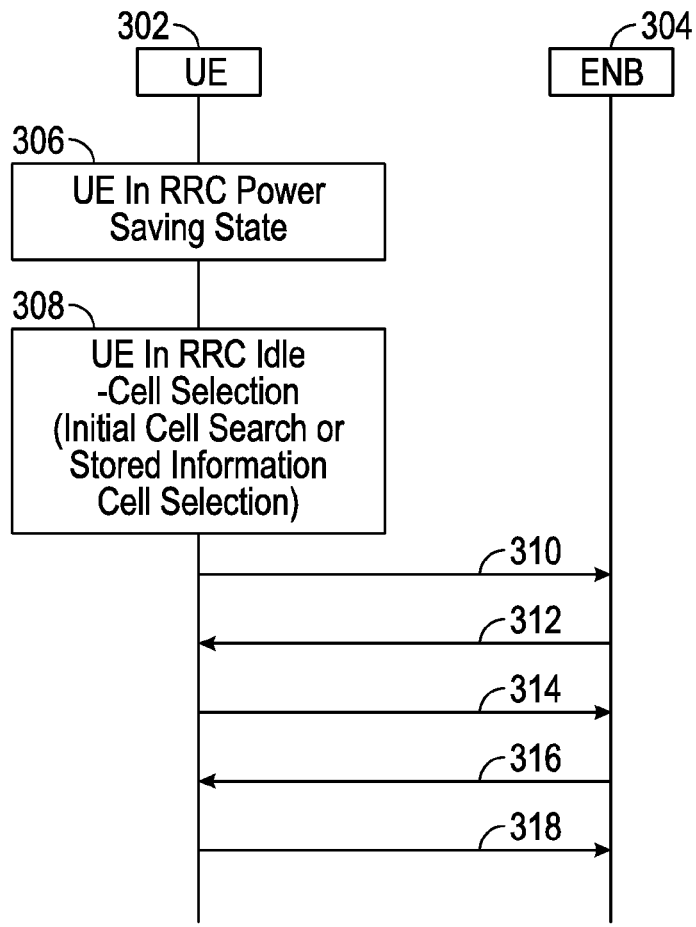
FIG. 3 illustrates generally an example of a diagram showing signaling messages in accordance with some embodiments.

FIG. 3 illustrates generally an example of a diagram showing signaling messages in accordance with some embodiments. In an example, the UE 302 can be in an RRC Power Saving state 306. The UE can transition from the RRC Power Saving state 306 to an RRC Idle state 308. The UE in the RRC Power Saving state 306 can include not performing AS selection (cell/RAT/PLMN, where RAT stands for Radio Access Technologies and PLMN stands for public land mobile network) or NAS (MM) procedures, although periodic registrations (RAU/TAU) procedures can continue. In the RRC Power Saving state 306, mobility management activities can be disabled or not executed. Additionally, for example, low mobility or stationary devices, such as devices enabled for MTC, cell re-selection can be optional as UE locations can remain unchanged due to low nomadic mobility.

In an example, the UE 302 can be in the RRC Power Saving state 306 until the expiration of a timer, such as a new specific timer defined for the power saving state (e.g. "unreachable timer" or "power saving timer" or "deep idle timer"). The timer can also be the TAU timer, which can include the same procedure as for periodic TAU. The timer can also be set according to each UE independently to the TAU timer and procedure. However, if a new power saving timer expired, the UE is not limited to one technique to move to a connected state and can move to a connected state using different establishment cause and NAS-PDU, such as can be defined and explained further below.

In an example, when the power saving timer expires, the UE 302 can select the cell and become connected, such as using an initial cell search or stored information cell selection. The UE 302 can be, for example, not camped in any cell with selected PLMN. The UE 302 can transition to an RRC Connected state using the tracking area update or service request. The UE 302 can send PRACH Preamble 310, receive a Random Access Response (RAR) 312, send RRC Connection Request (mo-Signaling or mt-Access or mo-Data) 314, receive RRC Connection Setup 316, and send RRC Connection Setup Complete 318. The RRC Connection Setup Complete 318 can include NAS PDU set as TAU Service Request. The RRC Connection Setup Complete 318 can be modified to include new NAS initial message. The UE 302 transition to an RRC Connected state can include a modified technique so the eNodeB and MME can adjust their responses differently for a UE that comes out of a power saving state to perform a MO (UL) data transfer or a TAU update or to check if there is any MT (DL) data that the network wants to transmit to it.

Figure 4:
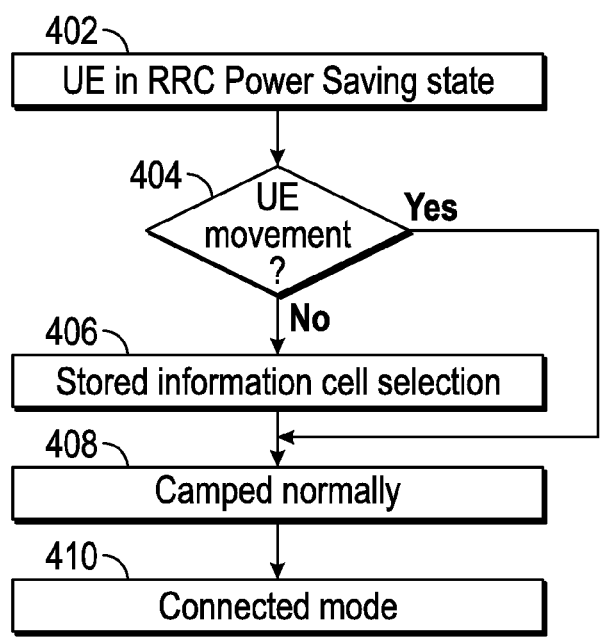
FIG. 4 illustrates generally an example of a flowchart showing a cell selection transition in accordance with some embodiments.

FIG. 4 illustrates generally an example of a flowchart showing a cell selection transition in accordance with some embodiments. The UE in RRC power saving state 402 can transition to RRC Idle and then to RRC Connected using a cell selection transition. If the UE in RRC power saving state 402 is not camped and selected PLMN is available (UE Movement 404 is yes), the UE can perform cell selection, such as searching for a suitable cell on which to camp. If the UE is stationary or the UE is a low mobile UE under good signal condition (UE Movement 404 is no), the UE can assume it is still camped on the same cell and can use the stored information cell selection 406 without checking the stored information for suitability. In either case, the UE can then proceed to be camped normally 408 and the UE can acquire the system information and enter a connected mode 410.

Table 1 illustrates generally a table of signaling messages. In an example, RRC Establishment Cause and NAS PDU Signaling messages can be mapped and described. Table D.1.1, as referred to below in Table 1, includes 3GPP Technical Specification 24.301 "Non-Access-Stratum (NAS) protocol for Evolved Packet System (EPS); Stage 3", release version 12.4.0 (Mar. 17, 2014) as can be amended.

TABLE 1

Mapping and description of RRC Establishment
Cause and NAS PDU Signaling messages

| NAS PDU | Establishment Cause | Description |
|---|---|---|
| Tracking Area Update (TAU) | mo-Signaling | Perform a tracking area update |
| Service Request | mo-Data | Perform UE user or signaling plane radio resource request, UL signaling |
| Service Request | mt-Access | Respond to a page or use this combination when UE wakes up from power saving state due to expiry of its timer to check if there is any MT data or in case the network needed to reach the device. |
| New message, e.g. Power Saving Update (PSU) | mo-Data mo-Signaling mt-Access | A new NAS signaling message, e.g. Power Saving Update (PSU). Similar methodology as described for periodic TAU can apply |

In an example, the MME can use an UE characteristic to avoid downloading UE context and capabilities information to the eNodeB (as it can be done in the periodic TAU), such as when there is no MT (DL) data expected. The MME can update a reachability information or flag when the UE returns from the RRC Power Saving state even if the UE context did not get downloaded. The MME can communicate some lightweight information to the eNodeB, and the eNodeB can be aware of the UE situation using the lightweight information. In an example, after sending the message to the MME, the eNodeB can react in a number of ways depending on the MME response. For example, the eNodeB can release the connection similarly to the periodic TAU updates, such as by passing the UE into RRC Idle. The eNodeB can establish a dedicated bearer for MT (DL) data. The eNodeB also can send the UE back into a Power Saving state without going through Idle, such as by using an explicit new message (e.g. RRC Power Saving Release message) or by using a pre-defined or pre-negotiated timer.

Figure 5:
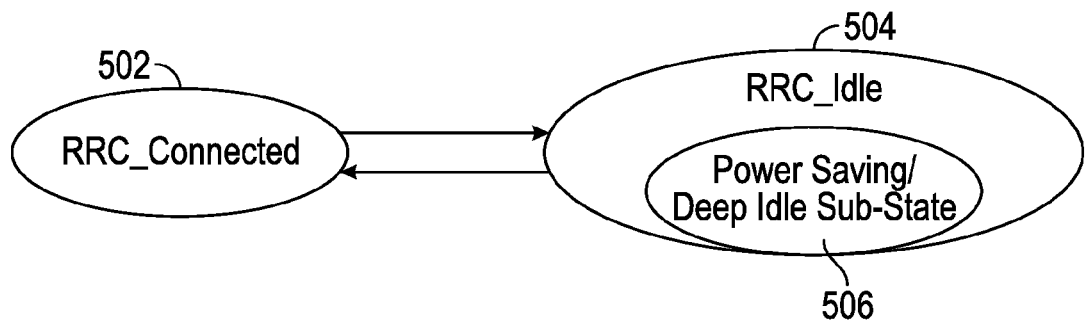
FIG. 5 illustrates generally an example of a diagram showing UE states and transitions including a deep idle sub-state in accordance with some embodiments.

FIG. 5 illustrates generally an example of a diagram showing UE states and transitions including a deep idle sub-state in accordance with some embodiments. In an example, a Power Saving or Deep Idle sub-state 506 is a UE mode that is a sub-state of an RRC_Idle state 504 but separate from an RRC_Connected state 502. The Power Saving or Deep Idle sub-state 506 can differentiate on the UE when or how idle activities can save UE power consumption. Differences between the Power Saving or Deep Idle sub-state 506 and the RRC_Idle state 504 can include reducing idle activity, such as AS related to inter or intra cell search and measurements. The UE can include MTC devices with low mobility. Similar techniques and apparatuses as described above for the new RRC power saving mode can apply to the Power Saving or Deep Idle new sub-state 506 and transitions between it and the RRC_Idle state 504, as well as transitions from the Power Saving or Deep Idle sub-state 506 ultimately to the RRC_Connected state 502 directly or indirectly through the RRC_Idle state 504.

Figure 6:
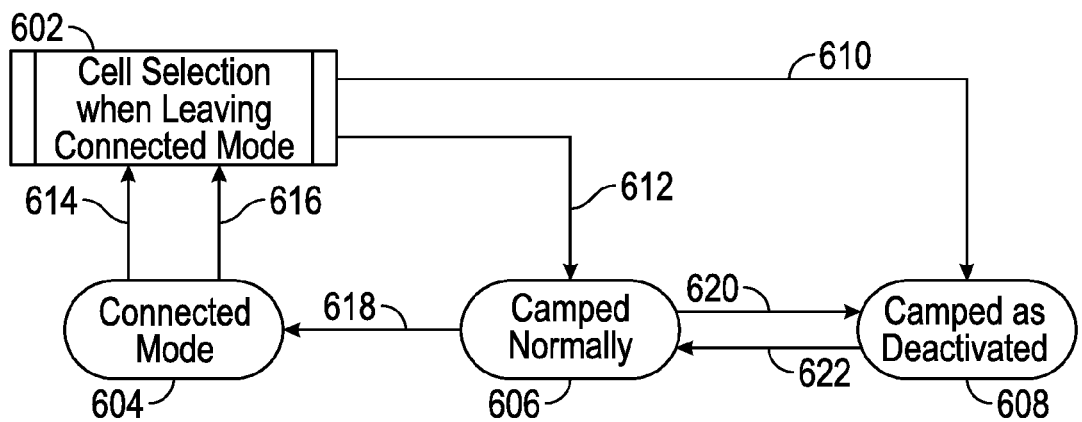
FIG. 6 illustrates generally an example of a diagram showing UE state transitions when leaving connected mode in accordance with some embodiments.

FIG. 6 illustrates generally an example of a diagram showing UE state transitions when leaving connected mode in accordance with some embodiments. In an example, the UE can be maintained in a number of different statuses, such as camped normally or camped on any cell or any cell selection. The UE can further be maintained in different AS modes such as Sleep, OFF, or disabled, or active or ON modes. The UE can include a simplified state, such as camped with AS OFF or camped AS deactivated 608. The UE can use cell selection 602 when leaving connected mode. In the camped AS deactivated 608 state, the UE can avoid performing cell reselection or the triggers to perform cell reselection can be disabled. The AS Sleep or OFF or disabled mode can be defined in an RRC Idle sub-state, such as an RRC Deep Idle mode, within the existing RRC Idle state or in a separate RRC Deep Idle state. In an example, the UE can be moved into RRC Idle by the network after a timer has expired, where the timer can include a pre-negotiated timer, or by direct indication of the network, such as through a new IE in RRC Connection Release or a new RRC message, and the UE can turn the AS off or go into the RRC Deep Idle mode or RRC Idle sub-state. This transition can occur even if the UE is mobile. The UE can wake up in time to listen to a paging channel. The UE can optionally perform cell synchronization or cell reselection. The UE can save power during the sleep periods, the sleep periods including time outside of paging occasions, if DRX paging cycles are extended beyond specified values, such as by entering the RRC Deep Idle mode. The RRCConnectionRelease can be extended to transition a UE to an RRC Idle state with AS Sleep mode. This RRCConnectionRelease can allow the UE to avoid maintaining a timer to turn the AS off. The RRC Idle state with AS sleep mode can include an extended DRX cycle value and corresponding timer.

In an example, when leaving connected mode, the UE can use cell selection 602 to find a suitable cell. If AS is deactivated, the UE can enter a camped AS deactivated mode 608 using a suitable cell found, AS deactivated transition 610. If AS is active, the UE can enter a camped normally mode 606 using a suitable cell found, AS active transition 612. The UE can leave the camped normally mode 606 and enter the camped AS deactivated mode 608 using a deactivate AS transition 620. Similarly, the UE can leave the camped AS deactivated mode 608 and enter the camped normally mode 606 using an activate AS transition 622. The UE can use a leave idle mode transition 618 to leave the camped normally mode and enter a connected mode 604. From the connected mode, the UE can return to Power Saving mode 614 or return to Idle mode 616.

Figure 7:
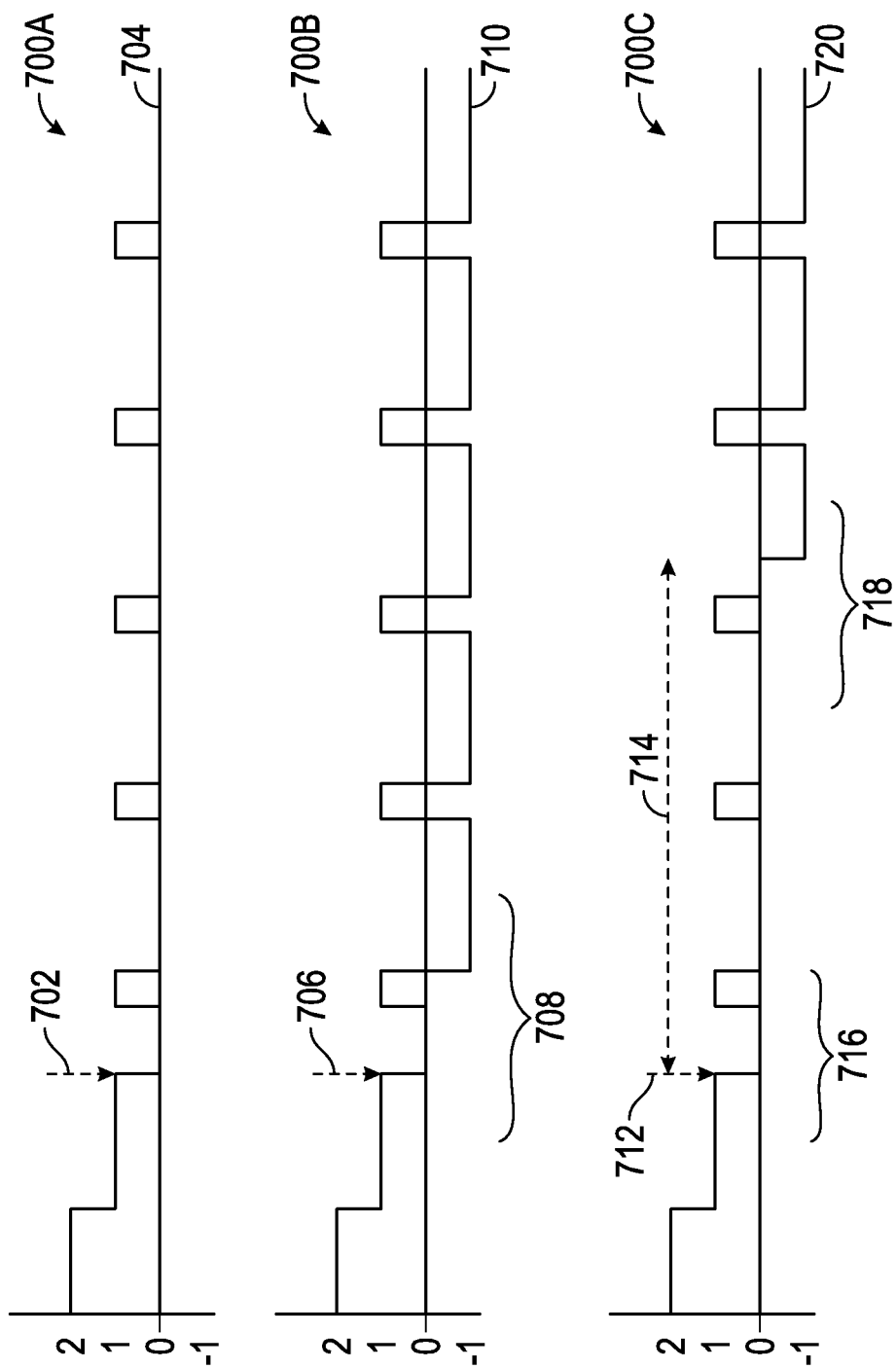
FIG. 7 illustrates generally examples of waveforms illustrating UE state transitions in accordance with some embodiments.

FIG. 7 illustrates generally examples of waveforms illustrating UE state transitions in accordance with some embodiments. Examples of three different waveforms 704, 710, and 720 are shown in graphs 700A, 700B, and 700C, respectively. In all three examples, when the waveforms are at 2, the examples can include an instance when the UE is in a connected mode that allows data TX or RX. When the waveforms are at 1 can include when the UE is active with no data pending (e.g. check PDCCH). When the waveforms are at 0, the examples can include an instance when the UE is in an Idle or Sleep mode. When the waveforms are at −1, the examples can include an instance when the UE is in an Idle or Sleep mode in a Power Saving sub-state or when the UE is in a Deep Idle mode. When the waveforms transition from 2 to 1 in all three examples, this can represent the UE transitioning from active data TX or RX to when there is no data to TX or RX.

The UE can transition from active with no data to an Idle mode, such as is represented by an RRC Connection Release 702 where the waveform 704 moves from 1 to 0. In graph 700A, the UE can be in an Idle mode, such as where the waveform 704 is 0 and can periodically check for data by entering a connected mode, such as where the waveform 704 is 1.

The UE can transition from active with no data to an Idle mode, such as is represented by an RRC Connection Release 706 where the waveform 710 moves from 1 to 0. In graph 700B, the UE can be in a Deep Idle state, such as where the waveform 710 is −1. The UE can transition to the power saving sub-state or Deep Idle state immediately from the connected state, or it can transition after the next paging operation (PO) as shown in graph 700B in the first transition zone 708, such as by first entering an Idle mode (waveform 710 is 0) and then entering the Deep Idle state after the next PO (where the waveform 710 transitions from 0 to 1 to −1).

The UE can transition from active with no data to an Idle mode, such as is represented by an RRC Connection Release 712 where the waveform 720 moves from 1 to 0. In graph 700C, the UE can be in a Deep Idle state, such as where the waveform 720 is −1. The UE can transition to the power saving sub-state or Deep Idle state after the expiration of a timer, such as a Power Saving Timer 714. The Power Saving Timer 714 can start immediately after the transition to an Idle state or it can start after the next PO as shown in graph 700C in the timer start zone 716. After the timer expires, the UE can transition to the power saving sub-state or Deep Idle state immediately from the connected state or from the Idle state or it can transition after the next PO as shown in graph 700C in the second transition zone 718 (where the waveform 720 transitions from 1 to 0 to −1).

In an example, the UE can transition between the connected and power saving sub-state immediately or after a short delay, such as to wake up before a PO to synchronize and compensate a clock drift.

Figure 8:
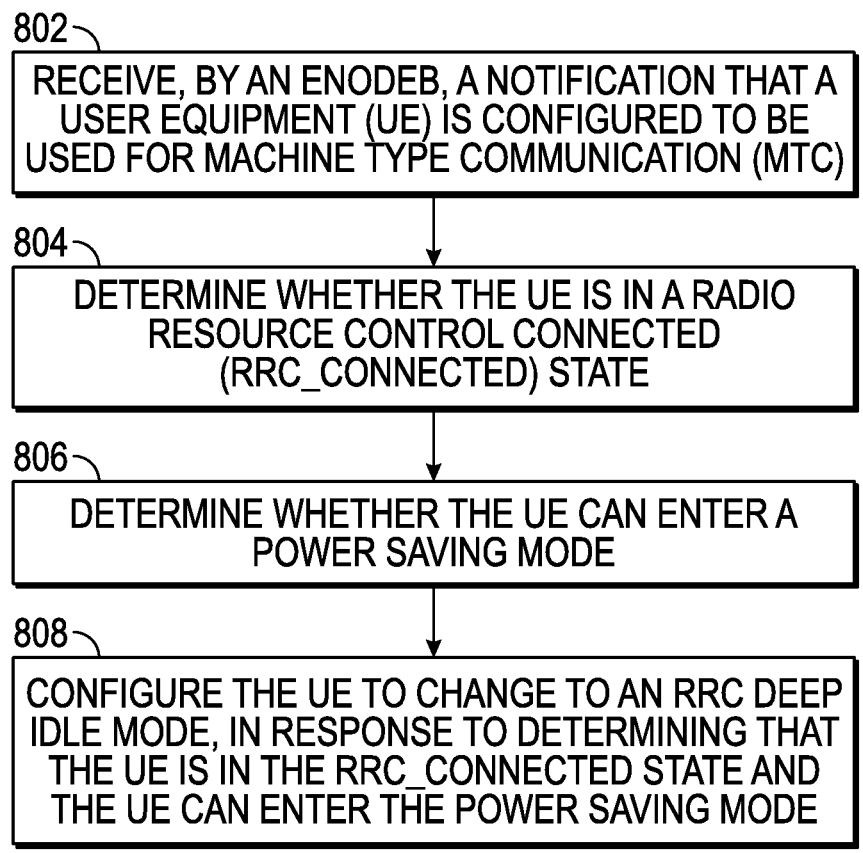
FIG. 8 illustrates generally a technique, such as a method, that can include configuring a UE to change to a Radio Resource Control (RRC) Deep Idle mode in accordance with some embodiments.

FIG. 8. illustrates generally a technique, such as a method, that can include receiving, by an eNodeB, a notification that a UE is configured to be used for MTC 802, determining whether the UE is in an RRC_Connected state 804, determining whether the UE can enter a power saving mode 806, and configuring the UE to change to an RRC Deep Idle mode, in response to determining that the UE is in the RRC_Connected state and the UE can enter the power saving mode 808 in accordance with some embodiments.

Figure 9:
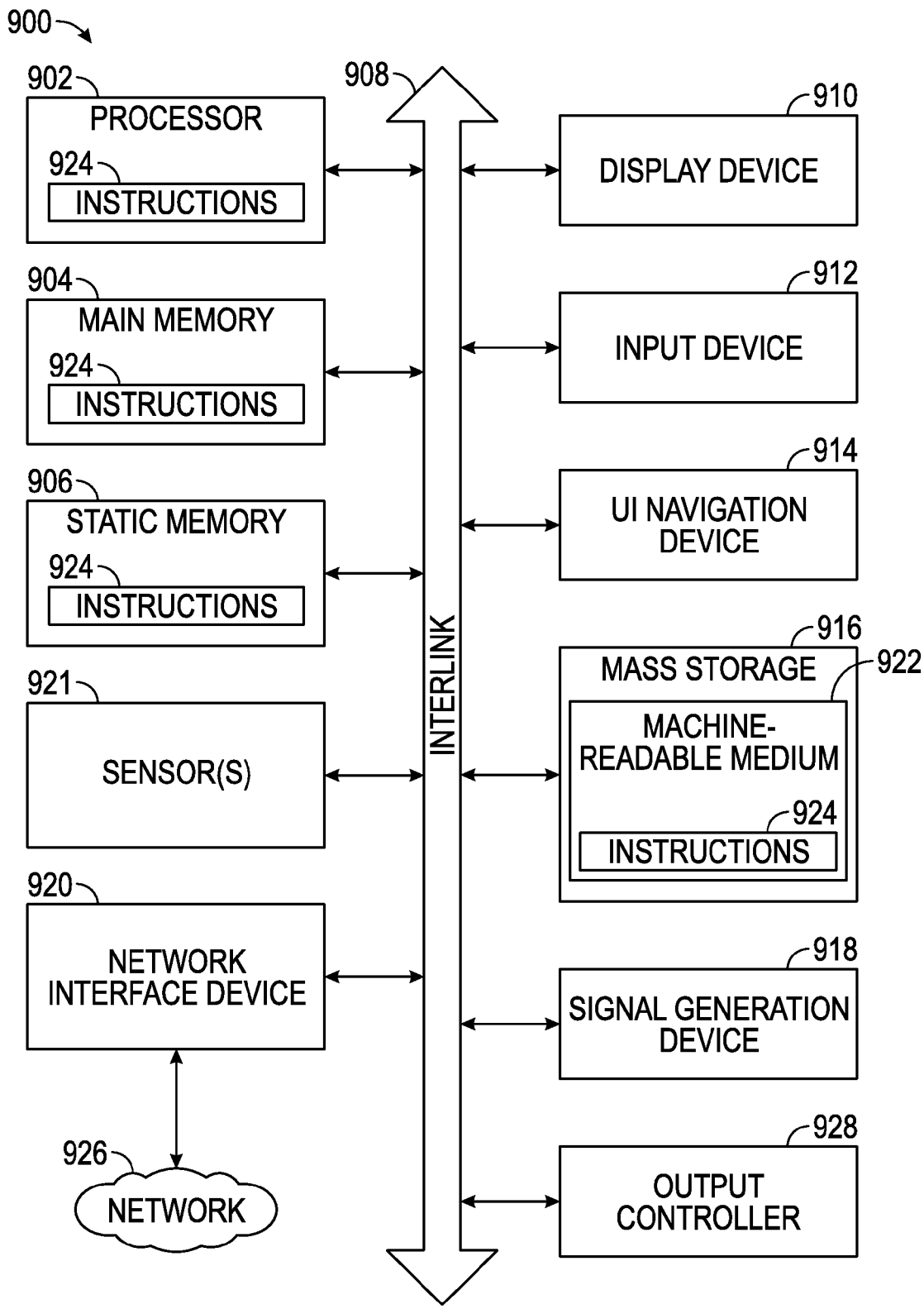
FIG. 9 illustrates generally an example of a block diagram of a machine upon which one or more embodiments can be implemented in accordance with some embodiments.

FIG. 9 illustrates generally an example of a block diagram of a machine 900 upon which any one or more of the techniques (e.g., methodologies) discussed herein can perform in accordance with some embodiments. In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 900 can include a hardware processor 902 (e.g., a central processing unit (CPU), a graphics processing unit (GPU), a hardware processor core, or any combination thereof), a main memory 904 and a static memory 906, some or all of which can communicate with each other via an interlink (e.g., bus) 908. The machine 900 can further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 can be a touch screen display. The machine 900 can additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 can include a machine readable medium 922 that is non-transitory on which is stored one or more sets of data structures or instructions 924 (e.g., software) embodying or utilized by any one or more of the techniques or functions described herein. The instructions 924 can also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 can constitute machine readable media.

While the machine readable medium 922 is illustrated as a single medium, the term "machine readable medium" can include a single medium or multiple media (e.g., a centralized or distributed database, and/or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

VARIOUS NOTES & EXAMPLES

Additional examples of the presently described method, system, and device embodiments are suggested according to the structures and techniques described herein. Other non-limiting examples can be configured to operate separately, or can be combined in any permutation or combination with any one or more of the other examples provided above or throughout the present disclosure.

Example 1 includes the subject matter embodied by an evolved Node B (eNodeB) comprising: a processor arranged to: receive a notification that a User Equipment (UE) is configured to be used for Machine Type Communication (MTC), determine whether the UE is in a connected state, determine whether the UE can enter a power saving mode, and configure the UE to change to a power saving mode, in response to determining that the UE is in the connected state and the UE can enter the power saving mode.

In Example 2, the subject matter of Example 1 can optionally include wherein the connected state comprises a Radio Resource Control Connected (RRC_Connected) state and the power saving mode comprises a Radio Resource Control (RRC) Deep Idle mode.

In Example 3, the subject matter of one or any combination of Examples 1-2 can optionally include wherein operations to determine whether the UE can enter the power saving mode include, upon expiration of a specified amount of time, operations to configure the UE to change to an RRC Idle state.

In Example 4, the subject matter of one or any combination of Examples 1-3 can optionally include wherein the RRC Deep Idle mode is a configuration in an RRC Idle state.

In Example 5, the subject matter of one or any combination of Examples 1-4 can optionally include wherein the RRC Deep Idle mode is an RRC Deep Idle state and is separately configured from an RRC Idle state In Example 6, the subject matter of one or any combination of Examples 1-5 can optionally include wherein operations to configure the UE to change to an RRC Deep Idle mode include operations to send a network indication to the UE.

In Example 7, the subject matter of one or any combination of Examples 1-6 can optionally include wherein the network indication includes a new NAS signaling message.

In Example 8, the subject matter of one or any combination of Examples 1-7 can optionally include wherein the network indication includes a Radio Resource Control Connection Release (RRCConnectionRelease) message.

In Example 9, the subject matter of one or any combination of Examples 1-8 can optionally include wherein the network indication includes a new RRC Power Saving Release message.

In Example 10, the subject matter of one or any combination of Examples 1-9 can optionally include operations to configure the UE to change to an RRC Idle state.

In Example 11, the subject matter of one or any combination of Examples 1-10 can optionally include wherein operations to configure the UE to change to an RRC Idle state occur only if data activity is expected.

In Example 12, the subject matter of one or any combination of Examples 1-11 can optionally include operations to use a timer to determine when to configure the UE to change to a power saving mode.

In Example 13, the subject matter of one or any combination of Examples 1-12 can optionally include wherein the operations to receive a notification occur over a wireless communications network comprising a 3rd Generation Partnership Project (3GPP) long term evolution (LTE) network.

In Example 14, the subject matter of one or any combination of Examples 1-13 can optionally include operations to configure the UE to leave the power saving mode upon expiration of a specified amount of time.

Example 15 can include, or can optionally be combined with all or portions of the subject matter of one or any combination of Examples 1-14 to include the subject matter embodied by a method performed by circuitry of an evolved Node B (eNodeB) including: receiving, by the eNodeB, a notification that a User Equipment (UE) is configured to be used for Machine Type Communication (MTC), determining whether the UE is in a connected state, determining whether the UE can enter a power saving mode, and configuring the UE to change to a power saving mode, in response to determining that the UE is in the connected state and the UE can enter the power saving mode.

In Example 16, the subject matter of Example 15 can optionally include using a timer to determine when to configure the UE to change to an RRC Deep Idle mode.

In Example 17, the subject matter of one or any combination of Examples 15-16 can optionally include wherein determining whether the UE can enter a power saving mode includes, upon expiration of a specified amount of time, configuring the UE to change to an RRC Idle state.

In Example 18, the subject matter of one or any combination of Examples 15-17 can optionally include wherein configuring the UE to change to an RRC Deep Idle mode includes sending a network indication to the UE.

Example 19 can include, or can optionally be combined with all or portions of the subject matter of one or any combination of Examples 1-18 to include the subject matter embodied by at least one machine-readable medium including instructions for operation of a computing system, which when executed by a machine, cause the machine to perform operations including: determine, by the UE, that the UE is configured to be used for Machine Type Communication (MTC), determine whether the UE is in a Radio Resource Control Connected (RRC_Connected) state, determine whether the UE can enter a power saving mode, and configure the UE to change to an RRC Deep Idle mode, in response to determining that the UE is in the RRC_Connected state and the UE can enter the power saving mode.

In Example 20, the subject matter of Example 19 can optionally include operations to use a timer to determine when to configure the UE to change to an RRC Deep Idle mode.

In Example 21, the subject matter of one or any combination of Examples 19-20 can optionally include wherein operations to determine whether the UE can enter a power saving mode include, upon expiration of a specified amount of time, operations to configure the UE to change to an RRC Idle state.

In Example 22, the subject matter of one or any combination of Examples 19-21 can optionally include wherein operations to configure the UE to change to an RRC Deep Idle mode include operations to send a network indication to the UE.

Example 23 can include, or can optionally be combined with all or portions of the subject matter of one or any combination of Examples 1-22 to include the subject matter embodied by User Equipment (UE) including: a transceiver configured to be used for Machine Type Communication (MTC), and a processor, coupled to the transceiver, arranged to: determine whether the UE is in a Radio Resource Control Connected (RRC_Connected) state, determine whether the UE can enter a power saving mode, and configure the UE to change to an RRC Deep Idle mode, in response to determining that the UE is in the RRC_Connected state and the UE can enter the power saving mode.

In Example 24, the subject matter of Example 23 can optionally include wherein determine whether the UE can enter a power saving mode includes, upon expiration of a specified amount of time, configure the UE to change to an RRC Idle state.

In Example 25, the subject matter of one or any combination of Examples 23-24 can optionally include wherein configure the UE to change to an RRC Deep Idle mode includes send a network indication to the UE.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The following claims are hereby incorporated into the detailed description, with each claim standing on its own as a separate embodiment.

What is claimed is:

1. An evolved Node B (eNodeB) comprising:
processing circuitry and memory configured to:

receive a notification that a User Equipment (UE) is configured to be used for Machine Type Communication (MTC);
in response to receiving the notification that the UE is configured to be used for MTC;
determine whether the UE is in a connected state, wherein the connected state comprises a Radio Resource Control Connected (RRC Connected) state;
determine whether the UE can enter a power saving mode, wherein the power saving mode comprises a Radio Resource Control (RRC) Deep Idle mode; and
send a power savings release message to the UE in response to determining that the UE is in the connected state and the UE can enter the power saving mode, the power savings release message including instructions to the UE to release the connected state and to enter a power saving mode and disable access stratum signaling.

2. The eNodeB of claim 1, wherein operations to determine whether the UE can enter the power saving mode include, upon expiration of a specified amount of time, operations to configure the UE to change to a Radio Resource Control Idle (RRC_Idle) state, wherein access stratum signaling is enabled while the UE is in the RRC Idle state.

3. The eNodeB of claim 1, wherein the RRC Deep Idle mode is a configuration in a Radio Resource Control Idle (RRC_Idle) state.

4. The eNodeB of claim 1, wherein the RRC Deep Idle mode is an RRC Deep Idle state and is separately configured from a Radio Resource Control Idle (RRC_Idle) state.

5. The eNodeB of claim 1, wherein the power savings release message includes a new non-access stratum signaling message.

6. The eNodeB of claim 1, wherein the power savings release message includes a Radio Resource Control Connection Release (RRCConnectionRelease) message.

7. The eNodeB of claim 1, wherein the power savings release message includes a new a Radio Resource Control (RRC) Power Saving Release message.

8. The eNodeB of claim 1 further comprising, operations to configure the UE to change to a Radio Resource Control Idle (RRC_Idle) state.

9. The eNodeB of claim 8, wherein operations to configure the UE to change to the RRC Idle state occur only if data activity is expected.

10. The eNodeB of claim 1 further comprising, operations to use a timer to determine when to configure the UE to change to a power saving mode.

11. The eNodeB of claim 1, wherein the operations to receive a notification occur over a wireless communications network comprising a 3rd Generation Partnership Project (3GPP) long term evolution (LTE) network.

12. The eNodeB of claim 1 further comprising, operations to configure the UE to leave the power saving mode upon expiration of a specified amount of time.

13. A method performed by circuitry of an evolved Node B (eNodeB) comprising:
receiving, by the eNodeB, a notification that a User Equipment (UE) is configured to be used for Machine Type Communication (MTC);
in response to receiving the notification that the UE is configured to be used for MTC;
determining whether the UE is in a connected state, wherein the connected state comprises a Radio Resource Control Connected (RRC Connected) state;
determining whether the UE can enter a power saving mode, wherein the power saving mode comprises a Radio Resource Control (RRC) Deep Idle mode; and
send a power savings release message to the UE in response to determining that the UE is in the connected state and the UE can enter the power saving mode, the power savings release message including instructions to the UE to release the connected state and to enter a power saving mode and disable access stratum signaling.

14. The method of claim 13 further comprising, using a timer to determine when to configure the UE to change to an RRC Deep Idle mode.

15. The method of claim 13, wherein determining whether the UE can enter a power saving mode includes, upon expiration of a specified amount of time, configuring the UE to change to a Radio Resource Control Idle (RRC_Idle) state and enable access stratum signaling.

16. At least one non-transitory machine-readable medium comprising instructions for operation of a computing system, which when executed by a machine, cause the machine to perform operations that:
determine, by the UE, that the UE is configured to be used for Machine Type Communication (MTC);
in response to determining that the UE is configured to be used for MTC;
determine whether the UE is in a Radio Resource Control Connected (RRC_Connected) state;
determine whether the UE can enter a power saving mode; configure the UE to change to an RRC Deep Idle mode and disable access stratum signaling, in response to determining that the UE is in the RRC_Connected state and the UE can enter the power saving mode;
after a period of time, configure the UE to transition to the RRC_Connected state;
determine whether the UE is stationary or has low mobility; and
responsive to a determination that the UE is stationary or has low mobility, select, for connection, a cell to which the UE was connected prior to entering the RRC Deep Idle mode.

17. The at least one non-transitory machine-readable medium of claim 16 further comprising, operations to use a timer to determine when to configure the UE to change to an RRC Deep Idle mode.

18. The at least one non-transitory machine-readable medium of claim 16, wherein operations to determine whether the UE can enter a power saving mode include, upon expiration of a specified amount of time, operations to configure the UE to change to a Radio Resource Control Idle (RRC_Idle) state and enable access stratum signaling.

19. The at least one non-transitory machine-readable medium of claim 16, wherein operations to configure the UE to change to an RRC Deep Idle mode include operations to receive a network indication at the UE.

20. User Equipment (UE) comprising:
a transceiver configured to be used for Machine Type Communication (MTC); and
a processor, coupled to the transceiver, arranged to:
determine whether the UE is in a Radio Resource Control Connected (RRC_Connected) state;

determine whether the UE can enter a power saving mode;

configure the UE to change to an RRC Deep Idle mode and disable access stratum signaling, in response to determining that the UE is in the RRC_Connected state and the UE can enter the power saving mode;

after a period of time, configure the UE to transition to the RRC_Connected state;

determine whether the UE is stationary or has low mobility; and responsive to a determination that the UE is stationary or has low mobility, select, for connection, a cell to which the UE was connected prior to entering the RRC Deep Idle mode.

21. The UE of claim 20, wherein determine whether the UE can enter a power saving mode includes, upon expiration of a specified amount of time, configure the UE to change to a Radio Resource Control Idle (RRC_Idle) state and enable access stratum signaling.

22. The UE of claim 21, wherein configure the UE to change to an RRC Deep Idle mode includes receive a network indication at the UE.

\* \* \* \* \*